United States Patent
Huls

(10) Patent No.: US 11,783,421 B2
(45) Date of Patent: Oct. 10, 2023

(54) TRAVELING-BASED INSURANCE RATINGS

(71) Applicant: Allstate Insurance Company, Northbrook, IL (US)

(72) Inventor: Eric D. Huls, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 423 days.

(21) Appl. No.: 15/184,580

(22) Filed: Jun. 16, 2016

(65) Prior Publication Data

US 2017/0365007 A1 Dec. 21, 2017

(51) Int. Cl.
| | |
|---|---|
| *G06Q 40/08* | (2012.01) |
| *H04W 4/40* | (2018.01) |
| *G07C 5/00* | (2006.01) |
| *H04W 8/18* | (2009.01) |
| *G07C 5/08* | (2006.01) |
| *H04W 4/02* | (2018.01) |

(52) U.S. Cl.
CPC ............ *G06Q 40/08* (2013.01); *G07C 5/008* (2013.01); *H04W 4/40* (2018.02); *H04W 8/18* (2013.01); *G07C 5/0816* (2013.01); *H04W 4/02* (2013.01); *H04W 4/027* (2013.01)

(58) Field of Classification Search
CPC ........ H04W 4/02; H04W 4/027; H04W 4/38; H04W 8/18; H04W 52/0254; G06Q 40/08; G07C 5/008; G07C 5/0816; G04Q 9/00; B60R 25/102

See application file for complete search history.

(56) References Cited

U.S. PATENT DOCUMENTS

| | | |
|---|---|---|
| 8,634,980 B1 | 1/2014 | Urmson et al. |
| 9,086,948 B1 | 7/2015 | Slusar et al. |

(Continued)

FOREIGN PATENT DOCUMENTS

| | | |
|---|---|---|
| CA | 2805439 A1 | 11/2013 |
| WO | 2004102536 | 11/2004 |

(Continued)

OTHER PUBLICATIONS

Aug. 28, 2017—Intl Search Report and Written Opinion—App/PCT/US17/036333.
Sep. 8, 2020—(CA) Office Action—App. No. 3026415.

*Primary Examiner* — Namrata Boveja
*Assistant Examiner* — Carol A See
(74) *Attorney, Agent, or Firm* — Dinsmore & Shohl LLP

(57) ABSTRACT

Disclosed herein is a traveling-based insurance rating system comprising a telematics device associated with a vehicle having one or more sensors arranged therein, a mobile device associated with a passenger of the vehicle, and a server computer comprising hardware, including a processor and memory. The server computer may receive driving data of a driver of the vehicle from the one or more sensors via the telematics device. The server computer may then identify one or more values of the driving data to be within one or more predetermined ranges and classify the driving data as a trip of the passenger. Based on the driving data from the trip, the server computer may determine one or more driving behaviors of the driver, calculate an insurance rating for the passenger of the vehicle based on the one or more driving behaviors of the driver, and transmit the insurance rating to the mobile device.

19 Claims, 6 Drawing Sheets

(56) References Cited

U.S. PATENT DOCUMENTS

| | | |
|---|---|---|
| 9,104,535 B1 | 8/2015 | Brinkmann et al. |
| 9,135,803 B1 | 9/2015 | Fields et al. |
| 2006/0122749 A1 | 6/2006 | Phelan et al. |
| 2007/0027726 A1* | 2/2007 | Warren .................. G06Q 40/08 705/4 |
| 2008/0255722 A1* | 10/2008 | McClellan ............ B60R 25/102 340/439 |
| 2009/0259349 A1 | 10/2009 | Golenski |
| 2011/0184784 A1 | 7/2011 | Rudow et al. |
| 2011/0213628 A1 | 9/2011 | Peak et al. |
| 2013/0006515 A1 | 1/2013 | Vellaikal et al. |
| 2014/0019170 A1 | 1/2014 | Coleman et al. |
| 2014/0108058 A1* | 4/2014 | Bourne .................. G06Q 40/08 705/4 |
| 2014/0257592 A1 | 9/2014 | Fernandes et al. |
| 2014/0257867 A1 | 9/2014 | Gay et al. |
| 2014/0266789 A1* | 9/2014 | Matus ...................... H04Q 9/00 340/870.07 |
| 2014/0278574 A1 | 9/2014 | Barber |
| 2014/0308978 A1 | 10/2014 | Herz et al. |
| 2014/0358326 A1 | 12/2014 | Phelan et al. |
| 2015/0120331 A1 | 4/2015 | Russo et al. |

FOREIGN PATENT DOCUMENTS

| | | |
|---|---|---|
| WO | 2014058964 | 4/2014 |
| WO | 2016028228 A1 | 2/2016 |

* cited by examiner

TRAVELING-BASED INSURANCE RATINGS

BACKGROUND

Insurance companies or providers may utilize telematics data to monitor and analyze driving performance of drivers insured by the insurance companies. Based on collected telematics data, insurance companies may evaluate the driving behaviors of drivers to assess their risk and determine an appropriate insurance cost and premium for each driver. In this way, insurance companies may additionally provide benefits to drivers that engage in safe driving behaviors.

By monitoring driving performance, insurance companies may be able to predict whether some drivers are more likely than other drivers to engage in high-risk driving which may often result in roadside incidents, such as vehicle breakdowns, accidents, collisions, and the like. For example, it may be particularly beneficial for insurance companies to monitor telematics data for vehicles in which one or more passengers may be riding along with a driver. Distractions from passengers may increase the driver's risk and the driver's inclinations to engage in dangerous or unsafe driving behaviors.

In some cases, it may be beneficial for insurance companies to account for data from drivers, as well as passengers in a vehicle with an insured driver and/or passengers traveling in any mode of transportation (e.g., train, bus, airplane, etc.) in the determination of insurance ratings and premiums. As such, new systems, methods, and devices may be desired in providing customized insurance ratings and premiums and utilizing traveling information for insurance ratings in an improved manner.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing computerized methods, systems, devices, and apparatuses for providing traveling-based insurance ratings. For example, a travel-based insurance rating system may determine insurance scores and ratings for a traveler based on data collected during any form of travel (e.g., car, train, bus, airplane, etc.), in which a traveler may be a driver of a vehicle, a passenger in a vehicle, or a passenger in any mode of transportation (e.g., a bus, a train, airplane, spacecraft, etc.). In some arrangements, the travel-based insurance rating system may detect any physical movement of a user, such as by at least one of one or more sensors of a mobile device, by a telematics device associated with a vehicle, or by one or more sensors in a vehicle during a trip. The insurance rating system may provide and adjust insurance rates for travelers based on the collected data, regardless of whether the traveler is a driver of a vehicle, a passenger of a vehicle, a passenger of another mode of transportation, or a user traveling in a bicycle or by foot (e.g., walking, jogging, or running).

The disclosure describes a system comprising a telematics device associated with a vehicle having one or more sensors arranged therein, a mobile device associated with a passenger of the vehicle, and a server computer comprising hardware including a processor and memory. The server computer may be configured to receive, from the one or more sensors and via the telematics device, driving data of a driver of the vehicle, identify one or more values of the driving data to be within one or more predetermined ranges, wherein the driving data is classified as a trip of the passenger, based on the driving data of the trip, determine one or more driving behaviors of the driver, calculate an insurance rating for the passenger of the vehicle based on the one or more driving behaviors of the driver, and transmit the insurance rating for the passenger to the mobile device.

The disclosure also describes an apparatus comprising at least one processor, a network interface configured to communicate, via a network, with a telematics device associated with a vehicle having one or more sensors arranged therein and a mobile device associated with a passenger of the vehicle, and a memory storing computer-readable instructions that, when executed by the at least one processor, cause the apparatus to receive, from the one or more sensors and via the telematics device, driving data of a driver of the vehicle, identify one or more values of the driving data to be within one or more predetermined ranges, wherein the driving data is classified as a trip of the passenger, based on the driving data from the trip, determine one or more driving behaviors of the driver, calculate an insurance rating for the passenger of the vehicle based on the one or more driving behaviors of the driver, and transmit the insurance rating for the passenger to the mobile device.

In addition, aspects of this disclosure provide a method that includes receiving, by one or more computing devices, driving data of a driver of a vehicle collected from one or more sensors installed on a mobile device of a passenger associated with the vehicle, identifying, by the one or more computing devices, the driving data to be within one or more predetermined ranges, wherein the driving data is classified as a trip of the passenger, determining, by the one or more computing devices, one or more driving behaviors of the driver based on the driving data from the trip, calculating, by the one or more computing devices, an insurance rating for the passenger based on the one or more driving behaviors of the driver, and transmitting, by the one or more computing devices, the insurance rating for the passenger to the mobile device.

Of course, the methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example, and is not limited by, the accompanying figures in which like reference numerals indicate similar elements and in which.

DETAILED DESCRIPTION

Figure 1:
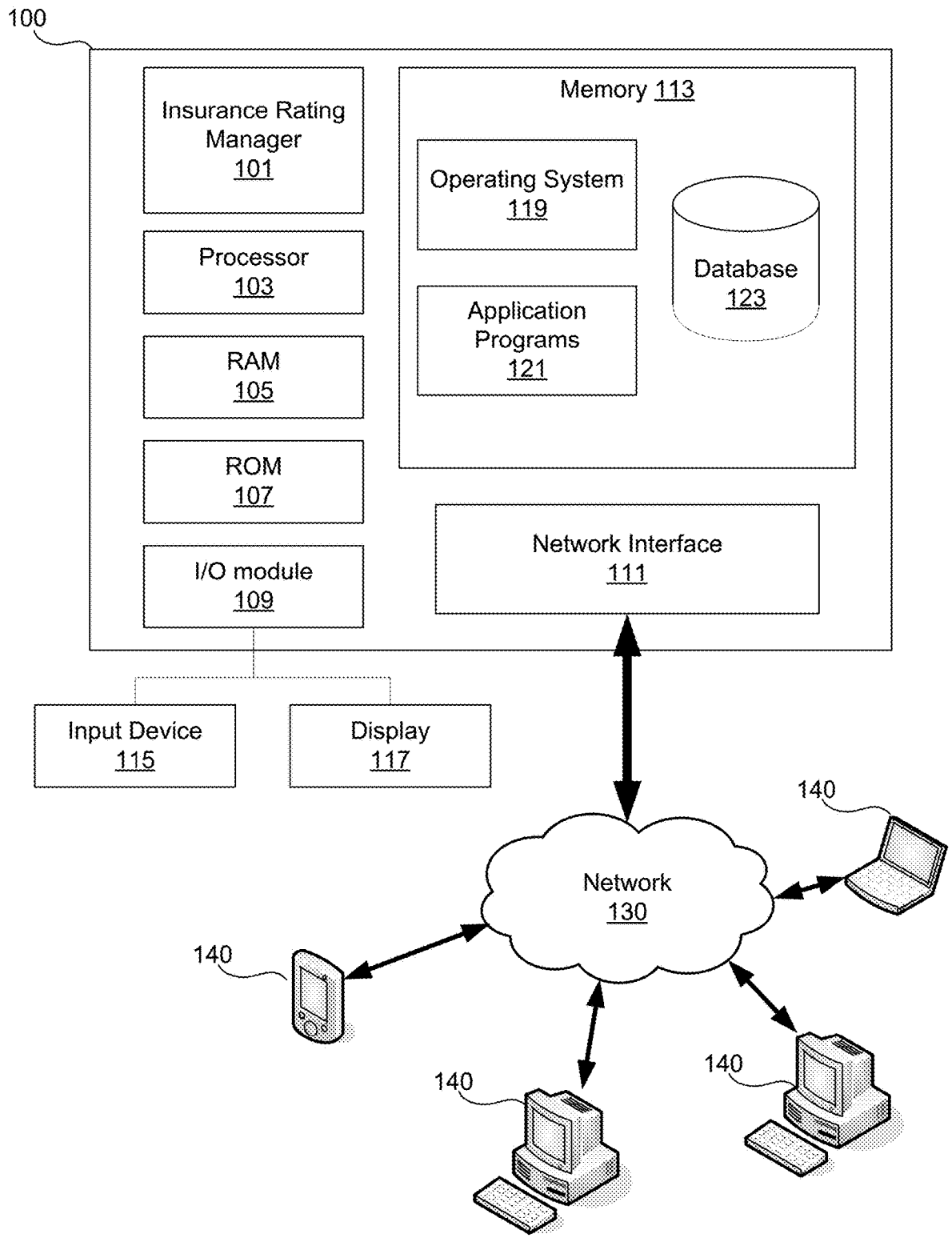
FIG. 1 depicts a block diagram of an example insurance rating device that may be used in accordance with one or more example embodiments.

In accordance with various aspects of the disclosure, computerized methods, systems, devices, and apparatuses are disclosed that provide traveling-based insurance premium ratings. In particular, the present disclosure teaches an insurance rating system that may be beneficial for travelers (e.g., both drivers and passengers) in that the system may determine insurance scores for individuals based on the number of miles traveled. For example, the insurance rating system may collect data from a traveler's mobile device, in which the traveler may be a driver of a vehicle, a passenger of a vehicle, a passenger in any other form of transportation (e.g., bus, train, airplane, helicopter, watercraft, spacecraft, etc.) or an individual traveling by a bicycle or by foot (e.g., walking, jogging, or running). The insurance rating system may then calculate an insurance rating or score for each traveler based on the data collected while the individual is traveling.

In some embodiments, the insurance rating system may determine that an individual is traveling by collecting data from the individual's mobile device. For example, a mobile application may be installed on the mobile device in order to monitor any traveling data (e.g., movement data and/or driving data) using one or more sensors of the mobile device. The traveling data may include real-time data, such as movement data representing any changes in position, velocity, and/or acceleration of a mobile device, and/or driving data representing a driver's speeds, accelerations, braking, GPS coordinates, and the like, associated with a vehicle. Furthermore, the insurance rating system may also utilize the mobile application to collect additional pertinent data for calculating insurance premium ratings.

In yet additional embodiments, the insurance rating system may determine that an individual is traveling by collecting data from a telematics device associated with a vehicle. For example, an individual may be a driver of a vehicle or a passenger of a vehicle. In some cases, there may be multiple travelers in a vehicle, including a driver and one or more passengers. The insurance rating system may collect data from one or more vehicle sensors and/or by the vehicle's on-board diagnostic (OBD) system in order to calculate insurance ratings. In some cases, the insurance rating system may collect traveling data from one of or both the individual's mobile device and from the telematics device of a vehicle in which the individual may be traveling. Additionally or alternatively, the insurance rating system may collect traveling data from another data source. In some examples, data collected from various sources may be aggregated to calculate insurance ratings, determine premiums or discounts, or the like.

The insurance rating system may utilize one or more predetermined ranges to determine whether or not a traveler is on a trip. For example, a traveler may have an insurance rating application installed on his or her mobile device, and the insurance rating application may automatically detect any physical movement or acceleration (e.g., from a traveler being in a moving vehicle, bus, train, airplane, helicopter, watercraft, spacecraft, or the like) through one or more sensors installed on the mobile device. In another example, the traveler may be moving, walking, jogging, running, or riding a bicycle, and the insurance rating application may automatically detect physical movements from the traveler through the one or more sensors installed on the mobile device. The application may collect data regarding any physical movement and read this data as traveling data (e.g., movement data and/or driving data). In order to determine whether or not the collected data is associated with an actual trip in a vehicle, the application may identify whether or not one or more values of the collected data are above or below one or more predetermined threshold values in a predetermined range.

For example, the predetermined range may indicate a range of values for at least one of vehicle speeds, vehicle locations, vehicle mileage, and average time driven. For example, if the detected movement includes speeds lower than 10 miles per hour or speeds faster than 200 miles per hour, the insurance rating system may determine that the traveler is not in a vehicle and may discard the collected data. However, if the one or more values of the collected traveling data are within the predetermined range, the application may identify the traveling data as driving data, classify the driving data as a trip for the traveler, and determine driving behaviors based on the driving data of the trip, as well as an insurance rating for the traveler according to the driving behaviors.

In some arrangements, the traveling-based insurance premium ratings disclosed herein may incentivize individuals who are riding as passengers in vehicles to refrain from distracting drivers. For example, a driver may be distracted by the presence and/or behaviors of one or more passengers in his or her vehicle. Passengers in the vehicle may engage in distracting behaviors such as playing loud music in the vehicle, talking on their mobile devices, or partaking in other actions that may divert the driver's attention on the road. Such distractions from passengers may increase the driver's risk and the driver's inclinations to engage in dangerous or unsafe driving behaviors. The insurance rating system may calculate insurance ratings for passengers of the vehicle based on the driving behaviors of the driver. Thus, passengers may realize that their own insurance ratings may be affected by how well or how badly an individual is driving. As a result, passengers may be incentivized not to distract drivers.

The insurance rating system may also collect information from a passenger's mobile device to identify distracting behaviors of a passenger while a driver is operating a vehicle. For example, a mobile application associated with the insurance rating system may be installed on the passenger's mobile device. In some embodiments, the application may determine the passenger's usage of the mobile device based on push notifications, messages, phone calls, and the like. For example, the application may identify a number of text messages sent, a number of text messages received, number of minutes the passenger talks on the mobile device, and the like while the passenger is in the vehicle. The insurance rating system may use this collected data, in addition to the driving behavior data of the driver, to determine insurance ratings.

In another example, the insurance rating application may utilize one or more sensors installed on a mobile device to detect sounds while the passenger is in the vehicle. A driver may be distracted by loud music in his or her vehicle, in which the loud music may prevent the driver from hearing warnings, such as sirens, vehicles honking, sounds of other vehicle braking, and the like. Thus, the one or more sensors of the mobile device (e.g., the passenger's mobile device or the driver's mobile device) may determine if there is loud music playing in the vehicle while the driver is driving. That is, the one or more sensors may include a microphone which may be able to identify sounds above a certain threshold level (e.g., a value of decibels). The insurance rating system may employ this collected data from the one or more sensors to determine and assign insurance ratings accordingly.

In some embodiments, the traveling-based insurance premium ratings may be referred to as passenger-based insurance premium ratings and vice versa. Traveling-based insurance premium ratings may also encourage insured individuals to choose to ride with drivers who engage in safe driving behaviors while traveling. That is, an individual's insurance score or rating may improve or decline based on the level of safety of a driver with whom the individual chooses to ride. For example, if a driver of a vehicle engages in safe driving behaviors, such as slow turns, driving at or below posted speed limits, safe braking, consistent acceleration, and the like, then the insurance rating system may assign a favorable insurance rating to the passenger of the vehicle. In another example, if a driver of a vehicle engages in unsafe driving behaviors, such as hard braking, sharp turns, inconsistent acceleration, speeding, missing traffic signals, failing to stop at road signs, drifting into other lanes, and the like, then the insurance rating system may assign an unfavorable insurance rating to the passenger of the vehicle. Therefore, travel-based insurance ratings may allow passengers to become more inclined to ride with safer drivers, which may result in fewer accidents and less costly insurance claims for insurance providers.

In additional embodiments, the insurance rating system may collect traveling data and calculate risk scores in order to evaluate risk levels of potential insurance customers. For example, an uninsured passenger may be traveling with a driver who is insured by an insurance company. In some cases, the passenger may engage in behaviors that distract the driver and disrupt the driver's driving behaviors, whereas in other cases, the passenger might not be disruptive to the driver. The insurance rating system may be able to evaluate a passenger based on the driver's driving behaviors and calculate a risk score for the passenger based on collected traveling data. The risk score may be useful in determining or predicting whether the passenger would be a high-risk or low-risk (or other risk level) customer if insured by the insurance company.

Therefore, the insurance rating system may determine high-risk and low-risk customers and assign insurance premiums accordingly, wherein high-risk customers may potentially have higher premiums than low-risk customers.

Ultimately, by providing travel-based insurance premium ratings, the insurance rating system may calculate insurance ratings for travelers (e.g., passengers and drivers) alike in an efficient manner.

In the following description of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is noted that these connections are general and, unless specified otherwise, may be direct or indirect, wired or wireless, and that the specification is not intended to be limiting in this respect.

In one or more arrangements, teachings of the present disclosure may be implemented with a computing device. FIG. 1 illustrates a block diagram of an example rating device 100 that may be used in accordance with aspects of the present disclosure. The rating device 100 is a specialized computing device programmed and/or configured to perform and carry out aspects associated with providing traveling-based insurance ratings to travelers as described herein. The rating device 100 may have an insurance rating manager 101 configured to perform methods and execute instructions as described herein. The insurance rating manager 101 may be implemented with one or more specially configured processors and one or more storage units (e.g., databases, RAM, ROM, and other computer-readable media), one or more application specific integrated circuits (ASICs), and/or other hardware components. Throughout this disclosure, the insurance rating manager 101 may refer to the software (e.g., a computer program or application) and/or hardware used to receive traveling data (e.g., driving data for drivers or passengers of vehicles), identify traveling data to be within one or more predetermined ranges, identify the traveling data as driving data based on the predetermined ranges, classify driving data as trips of passengers, determine one or more driving behaviors of drivers based on driving data from trips, calculate insurance ratings for passengers based on one or more driving behaviors of drivers, and/or notify passengers of calculated insurance ratings. Specifically, in some arrangements, the insurance rating manager 101 may be a part of an insurance rating system that assesses driving behavior data of a driver and other passenger information and assigns insurance ratings and scores to a passenger based on the driving behavior data of the driver. The one or more specially configured processors of the insurance rating manager 101 may operate in addition to or in conjunction with another general processor 103 of the rating device 100. In some embodiments, the insurance rating manager 101 may be a software module executed by one or more general processors 103. Both the insurance rating manager 101 and the general processor 103 may be capable of controlling operations of the rating device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, gesture or other sensors, and/or stylus through which a user or a driver associated with the rating device 100 may provide input data. The I/O module 109 may also be configured to be connected to a display device 117, such as a monitor, television, touchscreen, and the like, and may include a graphics card. The display device 117 and input device 115 are shown as separate elements from the rating device 100, however, they may be within the same structure.

Using the input device 115, system administrators may update various aspects of the traveling-based insurance rating system, such as rules, predefined threshold values, predetermined ranges, and/or information related to identifying whether or not traveling data is within one or more predetermined ranges, identifying traveling data as driving data based on the predetermined ranges, classifying driving data as passenger trips, determining driving behaviors of drivers based on driving data from one or more passenger trips, and calculating insurance ratings based on driving behaviors. For example, system administrators may use the input device 115 to update one or more predetermined ranges for classifying traveling data (e.g., movement data and/or driving data) as a passenger trip and for calculating insurance ratings. On some rating devices 100, the input device 115 may be operated by users (e.g., drivers of a vehicle, passengers in a vehicle, and/or passengers in any mode of transportation) to interact with the insurance rating system, including receiving or submitting information regarding traveling data and/or driving behaviors, requesting and/or receiving insurance ratings, providing or updating preferences for insurance ratings information, updating account information, and the like, as described herein.

The memory 113 may be any computer readable medium for storing computer executable instructions (e.g., software). The instructions stored within memory 113 may enable the rating device 100 to perform various functions. For example, memory 113 may store software used by the rating device 100, such as an operating system 119 and application programs 121, and may include an associated database 123.

The network interface 111 allows the rating device 100 to connect to and communicate with a network 130. The network 130 may be any type of network, including a local area network (LAN) and/or a wide area network (WAN), such as the Internet. Through the network 130, the rating device 100 may communicate with one or more computing devices 140, such as laptops, notebooks, smartphones, personal computers, servers, and the like. The computing devices 140 may include at least some of the same components as rating device 100. In some embodiments the rating device 100 may be connected to the computing devices 140 to form a "cloud" computing environment.

The network interface 111 may connect to the network 130 via communication lines, such as coaxial cable, fiber optic cable, and the like or wirelessly using a cellular backhaul or a wireless standard, such as IEEE 802.11, IEEE 802.15, IEEE 802.16, and the like. In some embodiments, the network interface may include a modem. Further, the network interface 111 may use various protocols, including TCP/IP, Ethernet, File Transfer Protocol (FTP), Hypertext Transfer Protocol (HTTP), and the like, to communicate with other computing devices 140.

FIG. 1 is an example embodiment of a rating device 100. In other embodiments, the rating device 100 may include fewer or more elements. For example, the rating device 100 may use the general processor(s) 103 to perform functions of the insurance rating manager 101, and thus, might not include a separate processor or hardware for the insurance rating manager 101. Additionally, or alternatively, the rating device 100 may be a mobile device (e.g., a smartphone, tablet, and the like) specially configured to perform or carry out aspects of the travel-based insurance rating service described herein, and thus, may also include various other components, such as a battery, speaker, and/or antennas (not shown). Also, the rating device 100 may be a telematics device and/or a vehicle computing device (either installed by a vehicle manufacturer or as an aftermarket part) having vehicle compatible elements, such as a port for an on-board diagnostic connector or ports for other vehicle sensors (e.g., fuel level sensors, tire pressure sensors, engine temperature sensors, and the like). For example, the rating device 100 may be a vehicle's computer or a device plugged into the vehicle's computer for use in vehicle telematics.

Figure 2:
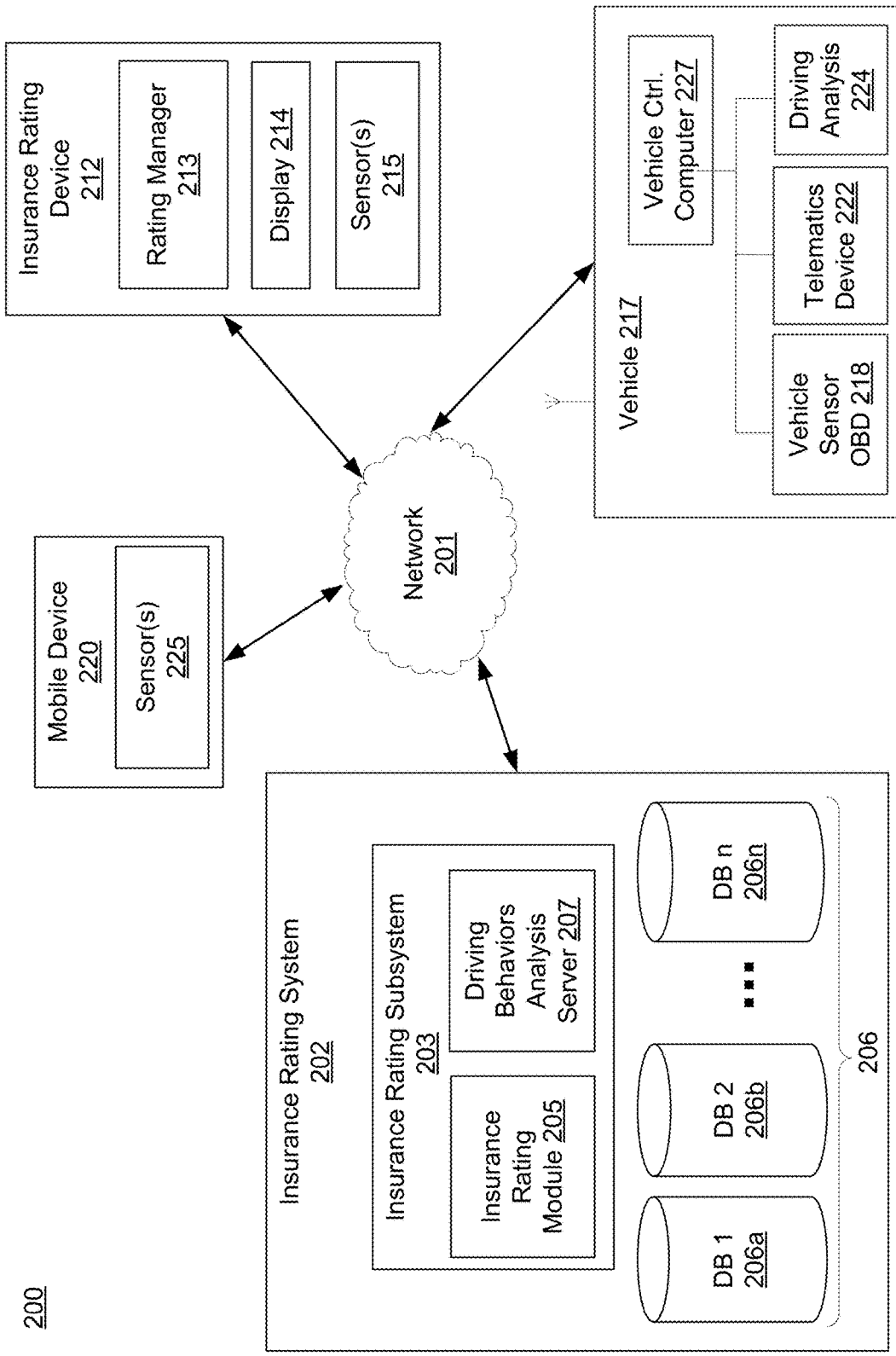
FIG. 2 depicts an example network environment in which various aspects of the present disclosure may be implemented in accordance with one or more example embodiments.

The computerized methods for providing travel-based insurance rating features and notifying travelers (e.g., passengers and/or drivers) of insurance scores as disclosed herein may be implemented on one or more rating devices 100 used in various network environments. FIG. 2 illustrates an example network environment 200 for implementing methods in accordance with aspects of the present disclosure.

As shown in FIG. 2, the network environment 200 may include a network 201 configured to connect an insurance rating system 202, insurance rating device 212, vehicle 217, and mobile device 220. The insurance rating device 212 may be the same as or at least similar to the rating device 100 described above with reference to FIG. 1. Collectively, these specialized computing devices may form at least a part of a traveling-based insurance rating system. Although only one of each of the components 212, 217, and 220 are shown in FIG. 2, it is understood that there may be any number of components 212, 217, and 220 in the network environment 200.

The network 201 may be any type of network, like the network 130 described above, and may use one or more communication protocols (e.g., protocols for the Internet (IP), Bluetooth, cellular communications, satellite communications, and the like) to connect computing devices and servers within the network environment 200 so they may send and receive communications between each other. In particular, the network 201 may include a cellular network and its components, such as cell towers.

Accordingly, for example, a mobile device 220 (e.g., a smartphone, flip-phone, tablet, and the like) or an insurance rating device 212 of a traveler (e.g., a passenger or a driver associated with vehicle 217 or a passenger in another form of transportation) may communicate, via a cellular backhaul of the network 201, with an insurance rating system 202 to request an insurance rating as a part of the travel-based insurance rating service. For example, the mobile device 220 or insurance rating device 212 may request for the insurance rating system 202 to provide travel-based insurance ratings for a traveler (e.g., passenger in the vehicle 217 and/or a driver of the vehicle 217 or a passenger in another form of transportation). In another example, the mobile device 220 or the insurance rating device 212 of the traveler (e.g., passenger or driver of the vehicle 217 or a passenger in another form of transportation) may communicate, via the cellular backhaul of the network 201, with the insurance rating system 202 to submit information regarding passenger or driver information, vehicle information or to update account information and/or preferences for the travel-based insurance rating service (e.g., for the vehicle 217).

In some arrangements, in the opposite direction, the insurance rating system 202 may communicate, via the cellular backhaul of the network 201, with the mobile device 220 or the insurance rating device 212 to notify the user (e.g., the passenger of vehicle 217 or the driver of vehicle 217 or a passenger in another form of transportation) of the mobile device 220 or insurance rating device 212 of collected traveling data (e.g., which may be further identified as driving data) one or more driving behaviors determined from the driving data, insurance ratings calculated based on the one or more driving behaviors, and the like. In another embodiment, the mobile device 220 and/or insurance rating device 212 may communicate back and forth with the insurance rating system 202 over the Internet, such as through a web portal. As shown in FIG. 2, it should be understood that the mobile device 220 or insurance rating device 212 may connect to the network even if it is removed from the vehicle 217. In some cases, the mobile device 220 or insurance rating device 212 may collect traveling data even when a user is moving or traveling without the vehicle 217 (e.g., such as in a bus, a train, airplane, spacecraft, bicycle, etc.). Thus, the travel-based insurance rating service described herein may be implemented with or without the vehicle 217.

Although FIG. 2 illustrates only one vehicle 217, the insurance rating system may be configured to communicate with multiple vehicles 217 simultaneously (e.g., at or around the same time), and the multiple vehicles 217 may be associated with multiple individuals. The insurance rating system 202 may receiving driving data for respective drivers of multiple vehicles simultaneously, identify values of the respective driving data to be within predetermined ranges, classify respective driving data as trips of passengers in the multiple vehicles simultaneously, determine driving behaviors for respective drivers of multiple vehicles simultaneously, calculate insurance ratings for respective passengers of the multiple vehicles simultaneously, and transmit notifications regarding the insurance ratings for respective passengers simultaneously. The multiple vehicles 217 may be any type of vehicle, including a car, motorcycle, bicycle, scooter, drone (or other automated device), truck, bus, boat, plane, helicopter, and the like, wherein each of the multiple vehicles 217 may be the same or different from each other.

In some embodiments, there may be one or more travelers (e.g., a driver and one or more passengers) associated with the vehicle 217. The driver may be associated with the vehicle 217 if the driver is an owner of the vehicle 217 and/or has access and/or permission to drive or operate the vehicle 217. Additionally or alternatively, a driver may be associated with the vehicle 217 if the driver is identified on an insurance policy that insures the vehicle 217. In some embodiments, one or more the passengers of the vehicle 217 may be uninsured or insurance policy holders.

A traveler (e.g., in the vehicle 217 or in another form of transportation) may interact with and operate an insurance rating device 212. In some embodiments, travelers may each operate the insurance rating device 212, which may be a specialized mobile device (e.g., mobile phone), a tablet, laptop, personal computer, and the like configured to perform or carry out aspects associated with travel-based insurance ratings as described herein. For example, the insurance rating device 212 may be the same (e.g., integrated with, include substantially the same components and provide substantially the same functionality, or the like) as the mobile device 220 depicted in FIG. 2. The insurance rating device 212 may belong to a driver, passenger, or customer of an insurance company who is enrolled in a travel-based insurance rating service. In some cases, the insurance rating device 212 may be at an insurance company, and data may be transmitted between the traveler and the device 212. Although only one insurance rating device 212 is illustrated in FIG. 2, there may be any number of rating devices 212, wherein each insurance rating device 212 is associated with at least one traveler. The insurance rating device 212 may further comprise a rating manager 213, a display 214, and sensors 215. In the case of an insurance rating device 212 that is installed in or connected to a vehicle 217 (e.g., an on-board vehicle computing device), the individual is considered to operate that insurance rating device 212 by performing the installation or connection of that device in or at the vehicle 217.

The insurance rating device 212 may be configured to execute the rating manager 213 that presents a user interface (e.g., a graphical user interface for a website, application, software program, and the like) on the display 214. The display 214 may comprise a monitor, television, touchscreen, and the like. The user interface of the rating manager 213 may allow travelers to send insurance rating requests and/or receive insurance ratings, confirm whether or not the traveler is driving, or a passenger, or on a different form of transportation, send and/or receive notifications of insurance scores based on traveling data (e.g., specifically based on driving behavior data), and update account information or preferences for travel-based insurance rating service provided by the insurance rating system 202.

The rating manager 213 may be a self-sufficient program or may be a module of another program, such as a program used to collect and/or evaluate traveler information representing actions of a vehicle 217, driving behavior of a driver associated with a vehicle 217, and/or status updates of a vehicle 217. The rating manager 213 may have access to traveling data (e.g., driving data and/or movement data) that is collected by the sensors 215 of the insurance rating device 212. The rating manager 213 may be configured in a similar manner as the insurance rating manager 101 or configured to perform similar functions as those performed by the insurance rating manager 101. The sensors 215 may comprise various sensors and/or modules that detect driving behaviors, environmental information, and/or other related factors of a driver of a vehicle 217. For example, the sensors 215 may comprise one or more of an accelerometer, speedometer, GPS, gyroscope, and the like. The sensors 215 may also include one or more of fuel level sensors, tire pressure sensors, car engine sensors, oxygen sensors, temperature sensors, water sensors, coolant sensors, position sensors, oil pressure gauges and the like. The sensors 215 may ultimately detect and collect real-time data, including movement data representing any changes in position, velocity, and/or acceleration of the insurance rating device 212, as well as driving data representing a driver's speeds, accelerations, braking, GPS coordinates, and the like, associated with vehicle 217. The rating manager 213 may have access to data that is collected by one or more of the sensors 215 of the insurance rating device 212.

In some cases, the sensors 215 may include a microphone which may be used to determine a level of sound in the vehicle 217 while a driver is operating the vehicle 217. The microphone of the rating device 212 (e.g., or a microphone installed on the mobile device 220) may identify sounds above a certain threshold level (e.g., a value of decibels), and the rating manager 213 may be able to determine an insurance rating based on the level of sound in the vehicle 217. For example, the rating manager 213 may take into consideration (e.g., as a variable in insurance rating/premium calculation) whether or not a driver or passenger of the vehicle 217 is playing loud music or whether or not a passenger of the vehicle 217 is distracting the driver by talking loudly or yelling in the vehicle 217. The rating manager 213 may use this collected data from the one or more sensors 215, along with driving data, to determine and assign insurance ratings to travelers accordingly.

In some embodiments, the rating manager 213 may be downloaded or otherwise installed onto the insurance rating device 212 using known methods. Different devices may install different versions of the rating manager 213 depending on their platform. A traveler may launch the rating manager 213 by, for example, operating buttons or a touchscreen on the insurance rating device 212. Additionally, or alternatively, the insurance rating device 212 may be configured to execute a web browser (e.g., an application for accessing and navigating the Internet) to access a web page providing an interface for the insurance rating system. In some embodiments, the insurance rating device 212 may also be configured to collect information, such as traveling data (e.g., movement data and/or driving data). For example, the rating manager 213 or another program installed on the insurance rating device 212 may instruct the insurance rating device 212 to collect traveling data using the various sensors 215 and/or vehicle sensors 218 (e.g., accelerometer, speedometer, GPS, gyroscope, magnetometer, car engine sensors, oxygen sensors, temperature sensors, water sensors, coolant sensors, position sensors, oil pressure gauges, and the like). Traveling data may include movement data representing any changes in position, velocity, and/or acceleration of a device (e.g., mobile device 220, insurance rating device 212, etc.) associated with a traveler, as well as data regarding a driver's speed, acceleration, braking, steering, turn signals, and the like.

The rating manager 213 or another program installed on the insurance rating device 212 may collect traveling data over a predetermined period of time and identify whether the one or more values of the collected traveling data are within one or more predetermined ranges. For example, the predetermined range may indicate a range of values for at least one of vehicle speeds, vehicle locations, vehicle mileage, and average time driven. If the one or more values of the traveling data are within the predetermined range, the rating manager 213 may identify the traveling data as driving data and classify the driving data as a trip for the traveler (e.g., for the passenger or driver of the vehicle 217). For example, if the one or more values of the traveling data are within the predetermined range, the rating manager 213 may determine that the collected data represents that the traveler is within a moving vehicle 217 and that the data is not collected from a traveler in another mode of transportation (e.g., walking, cycling, traveling in a bus, train, airplane, etc.). However, if the one or more values of the traveling data are not within the predetermined range, the rating manager 213 may identify that the collected data is not from the traveler being in a moving vehicle 217, and the rating manager 213 may continue to collect traveling data. After identifying traveling data as driving data, the rating manager 213 may determine driving behaviors based on the driving data of the trip, as well as an insurance rating for the traveler according to the driving behaviors.

Furthermore, the rating manager 213 or another program may determine one or more driving behaviors of the driver based on the driving data of the trip. For example, drivers may exhibit different driving behaviors, such as staying within or going above posted speed limits or engaging in or avoiding sudden braking or sharp turning events in vehicle 217. The rating manager 213 may identify these driving behaviors based on the collected driving data indicating acceleration, speed, angular momentum, and location of the vehicle 217. The rating manager 213 or another program may also collect location information, such as GPS coordinates indicating the geographical location of the insurance rating device 212 and/or vehicle 217. Ultimately, the rating manager 213 may calculate an insurance rating for the traveler (e.g., passenger and/or driver of the vehicle 217) based on the determined driving behavior data, and the rating manager 213 may transmit the insurance rating to the traveler (e.g., to a mobile device 220 or an insurance rating device 212 associated with the traveler).

In some arrangements, a driver and/or one or more passengers associated with the vehicle 217 and associated with the insurance rating device 212 may employ the rating manager 213 to send, receive, and/or access at least one of insurance ratings, driving behavior information, contact information, account information, and setting/preferences related to the vehicle 217.

As illustrated in FIG. 2, vehicle 217 also includes vehicle operation sensor 218 (similar to one or more sensors 215) capable of detecting and recording various conditions at the vehicle and operational parameters of the vehicle. For example, sensor 218 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensor 218 also may detect and store data received from the vehicle's 217 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board diagnostic systems (OBD).

Additional sensors 218 may detect and store the external driving conditions, for example, external temperature, rain, snow, light levels, and sun position for driver visibility. For example, external cameras and proximity sensors 218 may detect other nearby vehicles, vehicle spacing, traffic levels, road conditions, traffic obstructions, animals, cyclists, pedestrians, and other conditions that may factor into a driving data/behavior analysis. Sensor 218 also may detect and store data relating to moving violations and the observance of traffic signals and signs by the vehicle 217. Additional sensors 218 may detect and store data relating to the maintenance of the vehicle 217, such as the engine status, oil level, engine coolant temperature, odometer reading, the level of fuel in the fuel tank, engine revolutions per minute (RPMs), software upgrades, and/or tire pressure.

Vehicle sensor 218 also may include cameras and/or proximity sensors capable of recording additional conditions inside or outside of the vehicle 217. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensor 218 also may be configured to collect data identifying a current driver from among a number of different possible drivers, for example, based on driver's seat and mirror positioning, driving times and routes, radio usage, etc. Voice/sound data along with directional data also may be used to determine a seating position within a vehicle 217. Sensor 218 also may be configured to collect data relating to a driver's movements or the condition of a driver. For example, vehicle 217 may include sensors that monitor a driver's movements, such as the driver's eye position and/or head position, etc. Additional sensors 218 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer, along with other biometric sensors.

Certain vehicle sensors 218 also may collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, sensors and/or cameras 218 may determine when and how often the vehicle 217 stays in a single lane or strays into other lane. A Global Positioning System (GPS), locational sensors positioned inside the vehicle 217, and/or locational sensors or devices external to the vehicle 217 may be used to determine the route, speed, lane position, road-type (e.g. highway, entrance/exit ramp, residential area, etc.) and other vehicle position/location data.

The data collected by vehicle sensor 218 (e.g., driving data) may be stored and/or analyzed within the vehicle 217, such as for example by a driving analysis computer 224 integrated into the vehicle, and/or may be transmitted to one or more external devices. For example, as shown in FIG. 2, sensor data may be transmitted via a telematics device 222 to one or more remote computing devices, such as insurance rating device 212, mobile device 220, insurance rating system 202, and/or other remote devices.

As shown in FIG. 2, the data collected by vehicle sensor 218 may be transmitted to an insurance rating system 202, insurance rating device 212, mobile device 220, and/or additional external servers and devices via telematics device 222. Telematics device 222 may be one or more computing devices containing many or all of the hardware/software components as the insurance rating manager 101 depicted in FIG. 1. The telematics device 222 may receive vehicle operation data and driving data from vehicle sensor 218, and may transmit the data to one or more external computer systems (e.g., insurance rating system 202, insurance system server of an insurance company, financial institution, or other entity) over a wireless transmission network. Telematics device 222 also may be configured to detect or determine additional types of data relating to real-time driving and the condition of the vehicle 217. The telematics device 217 also may store the type of vehicle 217, for example, the make, model, trim (or sub-model), year, and/or engine specifications, as well as other information such as vehicle owner or driver information, insurance information, and financing information for the vehicle 217.

In some cases, the telematics device 222 may be a device that is plugged into the vehicle's 217 on-board diagnostic (OBD) system (e.g., plugged in through an OBD II connector) or otherwise installed in the vehicle 217 in order to collect data. The telematics device 222 may also collect GPS coordinates, such as through its own GPS receiver. In the example shown in FIG. 2, the telematics device 222 may receive vehicle driving data from vehicle sensor 218, and may transmit the data to an insurance rating system 202. As mentioned above, traveling data may include vehicle driving data, and this driving data may include data indicative of one or more vehicle metrics or vehicle telematics data, such as based on a driver's speed, acceleration, braking, steering, turn signals, and the like. In other examples, one or more of the vehicle sensors 218 or systems may be configured to receive and transmit data directly from or to an insurance rating system 202 without using a telematics device. For instance, telematics device 222 may be configured to receive and transmit data from certain vehicle sensors 218 or systems, while other sensors or systems may be configured to directly receive and/or transmit data to an insurance rating system 202 without using the telematics device 222. Thus, telematics device 222 may be optional in certain embodiments.

In some embodiments, telematics device 222 may be configured to execute a rating manager that presents a user interface for a traveler (e.g., driver and/or passenger) to provide inputs to and receive outputs from the insurance rating system 202. The rating manager 213 may be downloaded or otherwise installed onto the telematics device 222 using known methods. Once installed onto the telematics device 222, a driver may launch the rating manager 213 by, for example, operating buttons or a touchscreen on the dashboard of the vehicle 217. Additionally, or alternatively, the telematics 222 may be configured to execute a web browser to access a web page providing an interface for the insurance rating system 202.

FIG. 2 also illustrates a mobile device 220 which may be any mobile device associated with a traveler (e.g., a driver or passenger of vehicle 217, or an individual in another form of transportation). In particular, the mobile device 220 may belong to a traveler (e.g., driver or passenger of the vehicle 217 or an individual in another form of transportation), wherein the traveler is a customer of an insurance company and enrolled in a service that allows the traveler to participate in travel-based insurance rating services. Mobile device 220 may be, for example, a smartphone or other mobile phone, personal digital assistant (PDA), tablet computer, and the like, and may include some or all of the elements described above with respect to the insurance rating manager 101. As shown in this example, some mobile devices (e.g., mobile device 220) may be configured to establish communication sessions with vehicle-based devices and various internal components of vehicle 217 via wireless networks or wired connections (e.g., for docked devices), whereby such mobile devices 220 may have secure access to internal vehicle sensors 218 and other vehicle-based systems. However, in other examples, the mobile device 220 might not connect to vehicle-based computing devices and internal components, but may operate independently by communicating with vehicle 217 via their standard communication interfaces (e.g., telematics device 222, etc.), or might not connect at all to vehicle 217. In some cases, the mobile device 220 may be configured similarly to the insurance rating device 212 and may interface or communicate with the telematics device 222 via a wired connection (e.g., USB, OBD II connector, and the like) or a wireless connection (e.g., Bluetooth).

In some embodiments, both telematics device 222 and mobile device 220 (or an insurance rating device 212) may be employed, whereas in another embodiment, only one of these devices may be used with the insurance rating system to collect driving data. For example, a driver associated with the vehicle 217 may choose whether he or she wishes to use his or her mobile phone to capture driving data or whether he or she wishes to have a device plugged into the vehicle 217 to collect driving data.

FIG. 2 also illustrates example subsystems within the network environment 200. That is the insurance rating system 202 may comprise an insurance rating subsystem 203 and a plurality of databases 206. The insurance rating subsystem 203 may include one or more application servers, computing devices, and other equipment (e.g., conference bridge equipment) used by company (e.g., insurance company) personnel to implement and provide the travel-based insurance rating services described herein. For example, the insurance rating subsystem 203 may include an insurance rating module 205 that is configured with programmed instructions and/or algorithms to calculate and assign an insurance rating score to a traveler based on traveling data. In some cases, the insurance rating module 205 may be configured with programmed instructions and/or algorithms to calculate and assign an insurance rating score for a passenger of vehicle 217 based on driving data. The insurance rating module 205 may calculate insurance ratings for travelers (e.g., drivers and/or passengers) and store data regarding the insurance ratings as one or more records in a database (e.g., database 206) of the insurance rating system 202, in which the one or more records may be associated with passenger, driver or customer records stored in the database. For example, the one or more records may identify a unique identification number for a passenger, driver or customer. In one example, a mobile device may be associated with the traveler through the use of a unique identification number (e.g., a phone number) for the traveler. In another example, the one or more records may include multiple fields for insurance ratings, including premium level, deductible level, amounts, and the like. The insurance rating module 205 may update or adjust an insurance rating or insurance score by inserting one or more identifiers in the fields of the one or more records.

Furthermore, the insurance rating module 205 may also update or store information regarding traveling data, driving data, driving behaviors, insurance ratings, and the like in one or more databases 206. For example, one or more databases 206 may store traveling data (e.g., movement data and/or driving data) that is collected by sensors 215 of the rating device or vehicle sensors 218. The one or more databases 206 may also store insurance ratings for travelers.

The insurance rating subsystem 203 may include functionality that may be distributed among a plurality of computing devices. For example, the insurance rating subsystem 203 may comprise further subsystems, including client-side subsystems and server-side subsystems. The client-side subsystem may interface with the insurance rating device 212, telematics device 222, and/or mobile device 220, whereas the server-side subsystem may interface with application servers and computing devices which handle a variety of tasks related to identifying traveling data as driving data, classifying driving data as one or more trips based on predetermined ranges, identifying driving behaviors based on driving data from trips, and calculating insurance ratings based on driving behaviors, as well as the overall management of travel-based insurance rating services. For example, the subsystem 203 may also include one or more servers, such as a driving behaviors analysis server 207. The driving behaviors analysis server 207 may be configured to perform aspects of travel-based insurance rating services as described herein. For example, the driving behaviors analysis server 207 may analyze collected driving data for a driver of the vehicle 217, identify one or more driving behaviors, calculate insurance ratings for one or more passengers of the vehicle 217 based on the one or more driving behaviors, and/or provide notifications of the insurance ratings to the one or more passengers of the vehicle 217.

The subsystems, application servers, and computing devices of the insurance rating subsystem 203 may also have access to the plurality of databases 206. In some embodiments, the plurality of databases 206 may be incorporated into the insurance rating subsystem 203 or may be separate components in the insurance rating subsystem 203. As an example, the plurality of databases 206 (e.g., databases 206a-206n) may comprise an accounts and billing database, a driving behaviors database, an insurance rating database, and other databases. One or more of the databases 206a-206n may comprise information regarding at least one of driving behavior data, vehicle information, insurance rating information, and account and billing information. For example, databases 206a-206n may store one or more records of collected traveling data for previous trips, analyzed driving behaviors, insurance history, and the like. The data stored in the plurality of databases 206 may be collected and compiled by the insurance rating device 212, the telematics device 2220, the insurance rating subsystem 203, or by servers and subsystems within the insurance rating subsystem 203.

Figure 3:
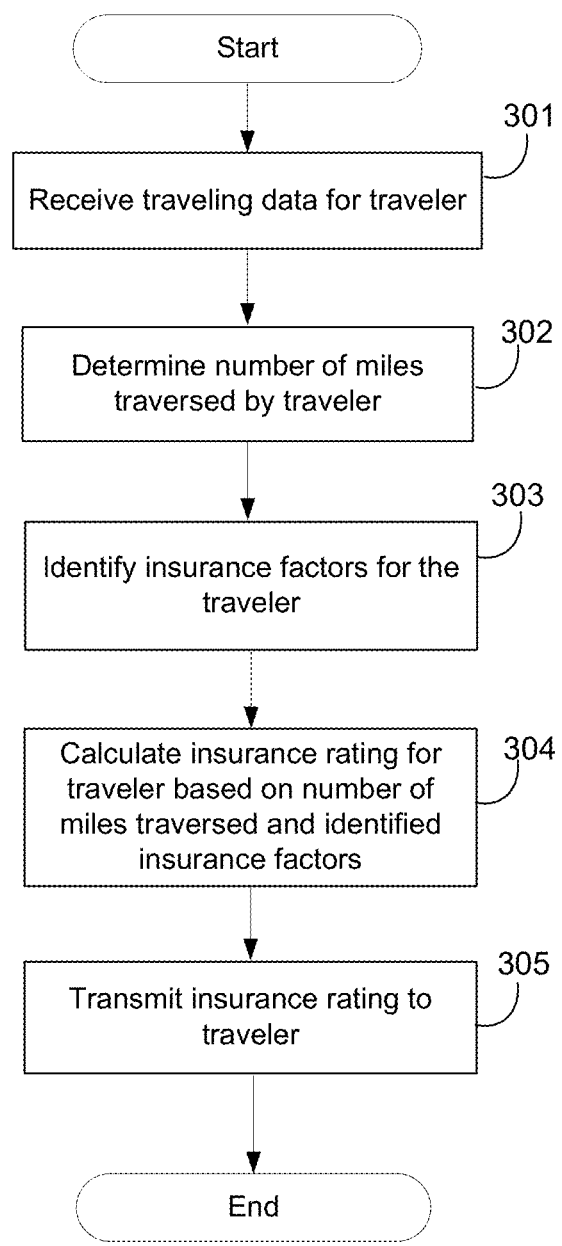
FIG. 3 depicts a flow diagram of example method steps for determining insurance ratings based on traveling data from users in accordance with one or more example embodiments.

FIG. 3 illustrates a flow diagram of an example method in accordance with aspects of the present disclosure. In particular, FIG. 3 illustrates example method steps for collecting traveling data and calculating travel-based insurance premiums for travelers. The steps of FIG. 3 may be performed by subsystems, application servers, and computing devices of the insurance rating system 202 (e.g., insurance rating subsystem 203, insurance rating module 205, and/or driving behaviors analysis server 207). One or more of the steps of FIG. 3 may be performed by executing a travel-based insurance rating program (e.g., a travel-based insurance rating mobile application) and/or by operating a particularly configured computing device of the insurance rating system 202. As a result of the method of FIG. 3, a traveler at insurance rating device 212 (e.g., and/or at mobile device 220) may be provided with an insurance rating based on traveling data.

The method of FIG. 3 may begin with a step of 301 of receiving traveling data for a traveler. For example, the insurance rating system 202 may receive traveling data for a traveler from at least one of the mobile device 220, telematics device 222, or insurance rating device 212. The insurance rating system 202 may receive traveling data collected over a period of time by one or more sensors (e.g., sensors 225, sensors 215, or vehicle sensor 218). The traveling data may include real-time data, such as movement data representing any changes in position, velocity, and/or acceleration of the mobile device 220 or the insurance rating device 212, and/or driving data representing a driver's speeds, accelerations, braking, GPS coordinates, and the like, associated with vehicle 217. In some embodiments, the traveler may be a driver of vehicle 217, a passenger in vehicle 217, or a passenger in any mode of transportation (e.g., a bus, a train, airplane, spacecraft, etc.). In other embodiments, the traveler may be moving by foot (e.g., walking, jogging, or running) or traveling on a bicycle.

At step 302, the insurance rating system may determine the number of miles traversed by a traveler. That is, the insurance rating system 202 may detect how many miles the traveler has traversed or traveled based on the traveling data collected over a period of time. For example, a traveler may be traveling on a plane and may traverse hundreds of miles over a shorter period of time than the number of miles that the traveler would traverse if traveling in a vehicle. In some arrangements, the insurance rating system 202 may thus detect the number of miles traveled by a traveler without distinguishing if the person is traveling by foot, by a bike, by a car, by aircraft, or by a spacecraft. At step 303, the insurance rating system may identify one or more insurance factors for the traveler. For example, the insurance rating system 202 may identify one or more traditional insurance factors for rating calculations, such as age, gender, number of years a traveler has been driving, credit history, driving history, number of accidents, number of moving violations, number of tickets, and the like. In some arrangements, the insurance rating system 202 may parse one or more databases 206 to obtain specific insurance factor information for the traveler.

At step 304, the insurance rating system may calculate an insurance rating for the traveler based on the number of miles traversed and the identified insurance factors. That is, the insurance rating system 202 may utilize the number of miles traversed as a factor in insurance rating and/or premium calculations. For example, the insurance rating system 202 may calculate an insurance rating based on varying weights of the number of miles traveled and the different insurance factors using one or more algorithms. At step 305, the insurance rating system may transmit the insurance rating to the traveler. For example, the insurance rating system 202 may transmit a notification regarding the calculated insurance rating to an insurance rating device 212 or a mobile device 220 associated with the traveler.

Figure 4:
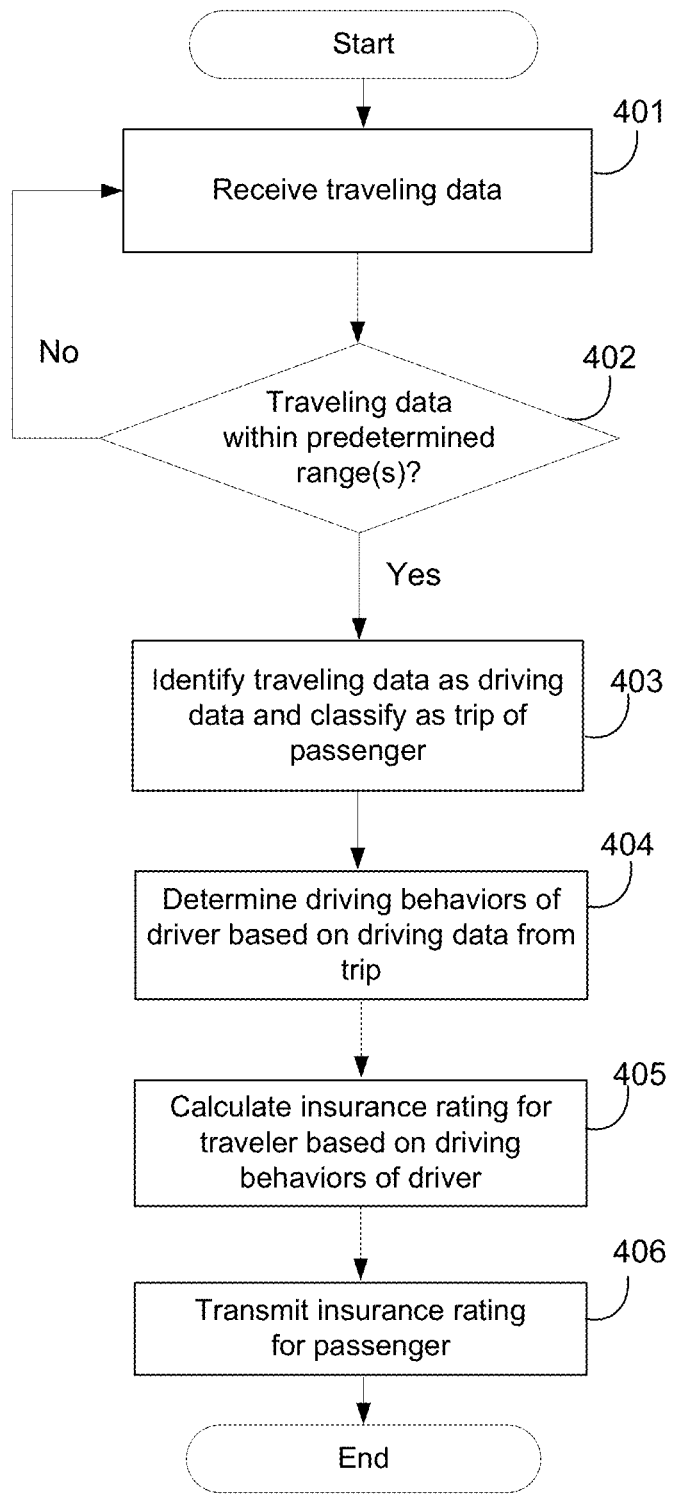
FIG. 4 depicts a flow diagram of example method steps for determining and providing traveling-based insurance ratings in accordance with one or more example embodiments.

FIG. 4 illustrates a flow diagram of an example method in accordance with aspects of the present disclosure. In particular, FIG. 4 illustrates example method steps for collecting traveling data, identifying driving trips, analyzing driving behaviors, and calculating travel-based insurance premiums for travelers. The steps of FIG. 4 may be performed by subsystems, application servers, and computing devices of the insurance rating system 202 (e.g., insurance rating subsystem 203, insurance rating module 205, and/or driving behaviors analysis server 207). One or more of the steps of FIG. 4 may be performed by executing a travel-based insurance rating program (e.g., a travel-based insurance rating mobile application) and/or by operating a particularly configured computing device of the insurance rating system 202. As a result of the method of FIG. 4, a passenger, at insurance rating device 212 (e.g., and/or at mobile device 220) and associated with vehicle 217, may be provided with an insurance rating based on driving behaviors of a driver of vehicle 217.

The method of FIG. 4 may begin with a step 401 of receiving traveling data for a traveler. For example, the insurance rating system 202 may receive traveling data for a traveler (e.g., driver of vehicle 217, passenger of the vehicle 217, or passenger in another mode of transportation) from at least one of the mobile device 220, telematics device 222, or insurance rating device 212. In some embodiments, the traveling data may be collected over a period of time by one or more sensors (e.g., sensors 225, sensors 215, or vehicle sensor 218), and the traveling data may include at least one of data indicating acceleration, speed, angular momentum, and location of the vehicle and/or movement data indicating any changes in position, velocity, and/or acceleration of the mobile device 220 or the insurance rating device 212. At step 402, the insurance rating system may identify whether or not the traveling data is within one or more predetermined ranges. For example, the insurance rating system 202 may determine if the collected traveling data is within a range of values for at least one of vehicle speeds, vehicle locations, vehicle mileage, and average time driven. If the one or more values of the traveling data are not within a predetermined range, then the method in this example may return to step 401, at which the insurance rating system 202 may continue to receive traveling data for the vehicle 217. The insurance rating system 202 may continue collection of traveling data for the vehicle 217 until the system 202 determines the one or more values of the traveling data to be within a predetermined range.

If the one or more values of the traveling data are within a predetermined range, then the method in this example proceeds to step 403. By using the predetermined ranges, the insurance rating system 202 may be able to detect whether collected data from the one or more sensors is associated with an actual trip in a vehicle 217 or whether the collected data is a detected movement from another source (e.g., from the traveler walking, riding a bike, traveling in an airplane, or the like).

At step 403, the insurance rating system may identify the traveling data as driving data and classify the driving data as a trip of a passenger. For example, the insurance rating system 202 may determine that the collected traveling data represents that the traveler is within a moving vehicle 217, and the system 202 may classify the driving data as a trip in vehicle 217 for the traveler. At step 404, the insurance rating system may determine one or more driving behaviors of a driver based on the driving data from the trip. For example, the traveler may be a passenger of the vehicle 217, and the insurance rating system 202 may determine driving behaviors of the driver of the vehicle 217 based on analyzing the collected driving data from the trip. Based on the driving data, the insurance rating system 202 may identify safe driving behaviors, such as slow turns, driving at or below posted speed limits, safe braking, consistent acceleration, and the like, and/or unsafe driving behaviors, such as hard braking, sharp turns, inconsistent acceleration, speeding, missing traffic signals, failing to stop at road signs, drifting into other lanes, and the like.

In some embodiments, the insurance rating system 202 may collect driving data over several periods of time and classify the collected driving data as several different trips. Once the insurance rating system 202 has collected driving data for a certain number of trips (e.g., a predetermined minimum number of trips), then the insurance rating system 202 may continue with determining driving behaviors (e.g., step 404) based on the compiled driving data from all of the trips.

The method of FIG. 4 continues at step 405, in which the insurance rating system may calculate an insurance rating for the passenger based on the determined driving behaviors. For example, the insurance rating system 202 may calculate or adjust an insurance rating (e.g., score) for the passenger based on the driver's safe or unsafe driving behaviors while driving the vehicle 217 with the passenger.

In some embodiments, the insurance rating system 202 may calculate an insurance rating based on one or more driving behaviors by scoring each driving behavior factor.

For example, driving behavior factors may include speed, braking, steering, turns signals, miles driven, amount of time driven at night, amount of time driven during daytime, acceleration, deceleration, cornering, and the like. The insurance rating system 202 may score each of the driving behavior factors based on the collected driving data from the vehicle 217 and assign a specific weight (e.g., a percentage of the driving behavior factor value) to each driving behavior factor. The insurance rating system 202 may then compute an overall driving score based on varying weights of the different driving behavior factors (which may be used in addition to traditional insurance factors). In some cases, the insurance rating system 202 may calculate one or more driving behavior scores and/or the overall driving score on a daily, weekly, monthly, or any other periodic basis.

Furthermore the insurance rating system 202 may include traditional insurance factors for calculating insurance ratings, in addition to driving behavior factors. For example, the insurance rating system 202 may use traditional insurance factors for rating calculations, such as age, gender, number of years the driver has been driving, credit history, driving history, number of accidents, number of moving violations, number of tickets, and the like. Based on these different factors, in addition to the driving behavior factors, the insurance rating system 202 may calculate an insurance rating based on varying weights of the different factors using one or more algorithms.

At step 406, the insurance rating system may transmit the insurance rating to the passenger. For example, the insurance rating system 202 may transmit a notification regarding the calculated insurance rating to an insurance rating device 212 or a mobile device 220 associated with the passenger of the vehicle 217.

Figure 5:
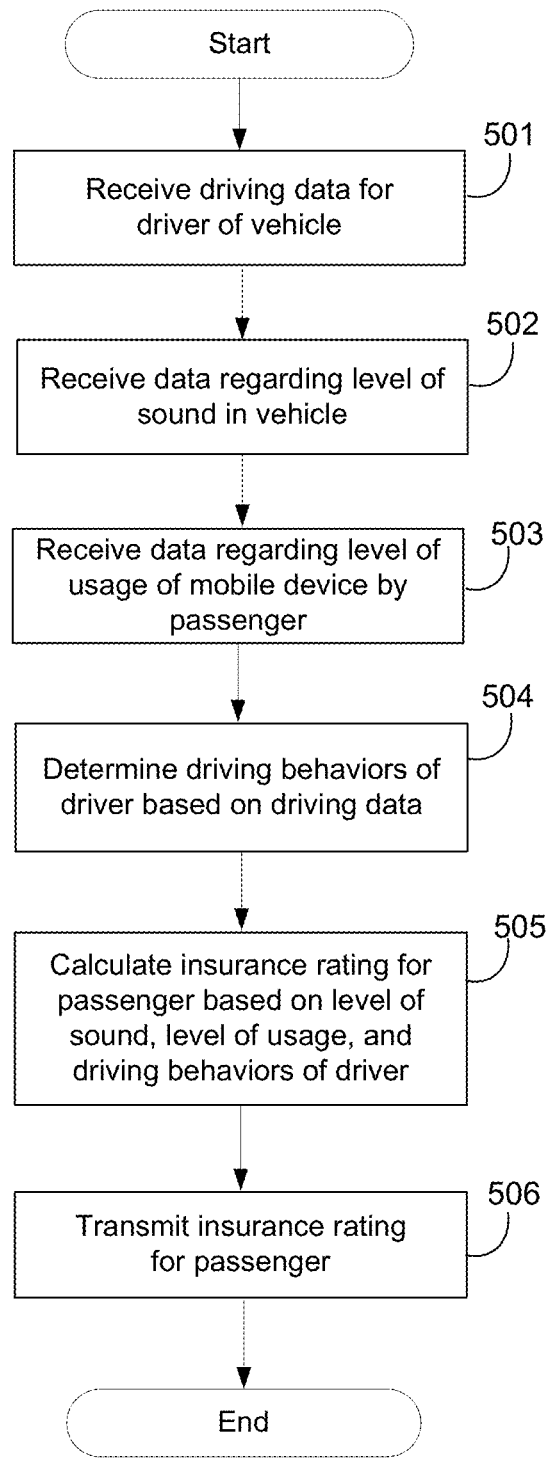
FIG. 5 depicts a flow diagram of example method steps for collecting data and determining and providing traveling-based insurance ratings in accordance with one or more example embodiments.

FIG. 5 illustrates a flow diagram of an example method in accordance with aspects of the present disclosure. In particular, FIG. 5 illustrates example method steps for collecting data and determining travel-based insurance ratings for passengers. The steps of FIG. 5 may be performed by subsystems, application servers, and computing devices of the insurance rating system 202 (e.g., insurance rating subsystem 203). One or more of the steps of FIG. 5 may be performed by executing a travel-based insurance rating program (e.g., a travel-based insurance rating mobile application) and/or by operating a particularly configured computing device of the insurance rating system 202. As a result of the method of FIG. 5, a passenger, at insurance rating device 212 (e.g., and/or at mobile device 220) and associated with vehicle 217, may be provided with an insurance rating based on sound levels in vehicle 217, usage levels of the passenger, and driving behaviors of a driver of vehicle 217.

The method of FIG. 5 may begin with a step 501 of receiving driving data for a driver of the vehicle. For example, the insurance rating system 202 may receive driving data for a driver of the vehicle 217 from at least one of the mobile device 220, telematics device 222, or insurance rating device 212. In some embodiments, the driving data may be collected over a period of time by one or more sensors (e.g., sensors 225, sensors 215, or vehicle sensor 218), and the driving data may include at least one of data indicating acceleration, speed, angular momentum, and location of the vehicle. At step 502, the insurance rating system may receive data regarding a level of sound in the vehicle. For example, the insurance rating system 202 may receive data regarding detected sounds from one or more sensors (e.g., sensors 225, sensors 215, or vehicle sensor 218) in a vehicle 217. In some cases, one or more sensors 225, such as a microphone, installed on a passenger's or driver's mobile device 220 may detect sounds (e.g., loud music) above a certain threshold level (e.g., a value of decibels) in the vehicle 217. The insurance rating system 202 may receive data indicating the value of decibels of loud music or loud sounds in the vehicle 217.

At step 503, the insurance rating system may receive data regarding a level of usage of a mobile device by the passenger. For example, the insurance rating system 202 may receive data regarding the passenger's usage of the mobile device 220 or insurance rating device 212 in the vehicle 217. In some cases, the passenger's use of his or her device may be distracting to the driver of the vehicle 217, and the insurance rating system 202 may account for this usage level in determining insurance ratings for the passenger. The passenger may provide an insurance rating application (e.g., insurance rating manager 213) installed on the passenger's device with access (e.g., permission levels) to determine the passenger's usage of the device based on push notifications, messages, phone calls, and the like. The insurance rating application may identify a number of text messages sent, a number of text messages received, number of minutes the passenger talks on the mobile device, and the like while the passenger is in the vehicle 217. The application may then transmit data regarding the passenger's usage of the mobile device 220 or insurance rating device 212 to the insurance rating system 202.

At step 504, the insurance rating system may determine driving behaviors of a driving based on the driving data. For example, the insurance rating system 202 may determine driving behaviors of the driver of the vehicle 217 based on analyzing the collected driving data. Based on the driving data, the insurance rating system 202 may identify safe driving behaviors, such as slow turns, driving at or below posted speed limits, safe braking, consistent acceleration, and the like, and/or unsafe driving behaviors, such as hard braking, sharp turns, inconsistent acceleration, speeding, missing traffic signals, failing to stop at road signs, drifting into other lanes, and the like.

At step 505, the insurance rating system may calculate an insurance rating for the passenger based on the level of sound, level of usage, and determined driving behaviors. For example, the insurance rating system 202 may calculate or adjust an insurance rating (e.g., score) for the passenger based on how distracting the passenger is to the driver in the vehicle 217 as indicated by the passenger's usage of his or her mobile device 220, based on how loud the passenger is in the vehicle 217 (e.g., or how loud the music is in the vehicle 217) as indicated by the sound levels in the vehicle 217, and/or based on the driver's safe or unsafe driving behaviors while driving the vehicle 217 with the passenger.

At step 506, the insurance rating system may transmit the calculated insurance rating to the passenger. For example, the insurance rating system 202 may transmit a notification regarding the calculated insurance rating to an insurance rating device 212 or a mobile device 220 associated with the passenger of the vehicle 217.

Figure 6A:
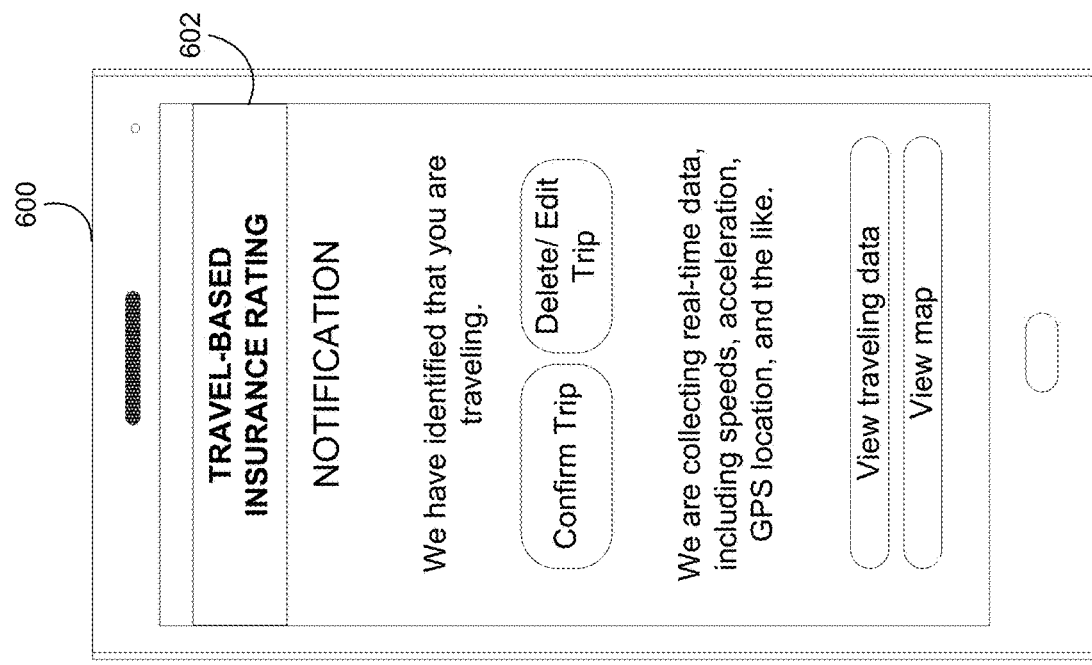
FIGS. 6A and 6B depict an illustrative diagram of example user interfaces of a traveling-based insurance rating application in accordance with one or more example embodiments.
Figure 6B:
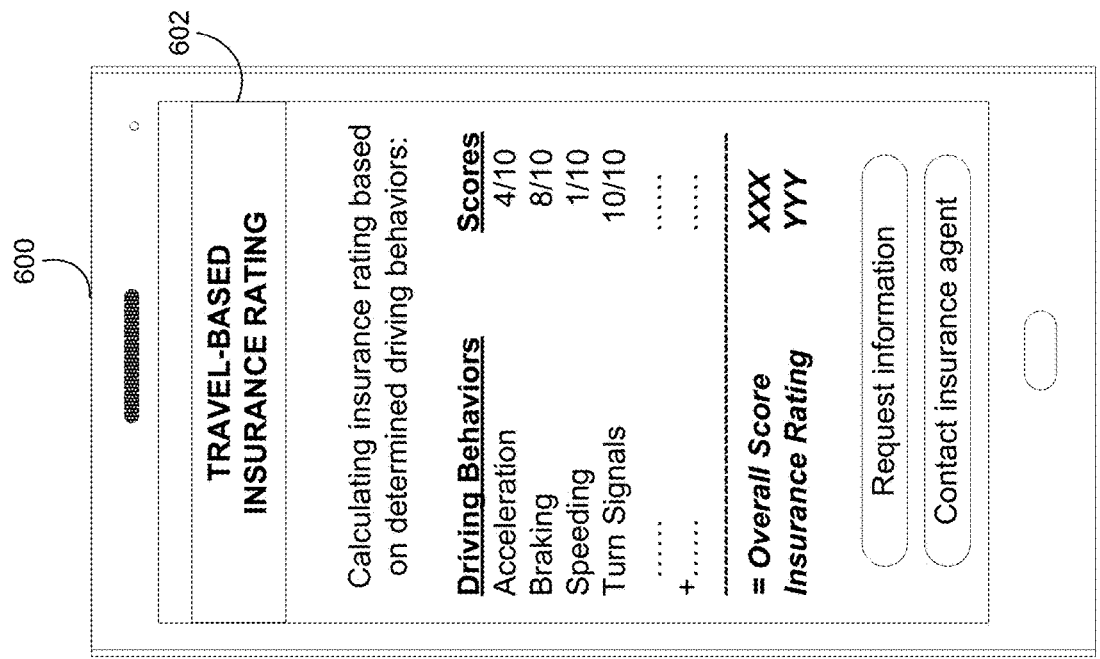

FIGS. 6A and 6B each depict an illustrative diagram of example user interfaces of a travel-based insurance rating application 602 operating on a rating device 600 in accordance with aspects of the present disclosure. The example user interfaces may be presented on a display of a computing device, such as display 214 of insurance rating device 212, on a mobile device such as mobile device 220 in FIG. 2, on a vehicle display of an on-board vehicle computing device, or the like. A traveler (e.g., any user including a passenger of a vehicle or any mode of transportation or a driver operating a vehicle, such as vehicle 217) may access a travel-based insurance rating application 602 using a rating device 600 (e.g., at least one of the insurance rating device 212, telematics device 222, or mobile device 220). Specifically, FIGS. 6A and 6B illustrate example user interfaces of utilizing a travel-based insurance rating application 602 to view and manage travel-based insurance rating services.

The user interface in FIG. 6A depicts an example of a notification that the travel-based insurance rating application 602 may depict to a user (e.g., a passenger or driver of a vehicle) after detecting that the user is traveling. In some embodiments, the user may be able to confirm that he or she is traveling in a vehicle on the travel-based insurance rating application 602. In other embodiments, the user might not be in a vehicle and may instead be traveling on a plane (e.g., on an airplane runway or in the air), riding a bike, walking, or the like. In such cases, the user may be able to edit or delete the trip data using the travel-based insurance rating application 602.

The travel-based insurance rating application 602 may also alert the user that the application is collecting real-time traveling data, including speeds, acceleration, GPS location, and the like, using one or more sensors on the mobile device (e.g., mobile device 220) or vehicle sensors. The user may be provided with options on the user interface to view the traveling data or view a map with the user's location.

The user interface in FIG. 6B depicts an example of what the travel-based insurance rating application 602 may present to a user after the insurance rating system has calculated insurance ratings. For example, the travel-based insurance rating application 602 may determine driving behaviors based on driving data of a driver and compute scores for each driving behavior. The travel-based insurance rating application 602 may then compute an overall score and determine or adjust an insurance rating for a passenger or driver according to the overall score from the driving behaviors. By utilizing the travel-based insurance rating application 602, users may request additional information regarding the insurance rating and overall score, and also contact an insurance agent to discuss further regarding insurance options and insurance coverage.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system comprising:
a telematics device associated with a vehicle having a first plurality of sensors arranged therein;
a mobile device associated with a first traveler in the vehicle, the mobile device including a second plurality of sensors; and
a server computer, comprising hardware including a processor and memory, the server computer configured to:
receive, from the mobile device, traveler information associated with the first traveler and a second traveler in the vehicle;
receive, from at least one of: the first plurality of sensors or the second plurality of sensors, data regarding a level of sound in the vehicle;
determine, from the received traveler information, that the first traveler is a passenger in the vehicle and the second traveler is a driver of the vehicle, determining that the second traveler is a driver of the vehicle is based on the traveler information including identification of the second traveler as a holder of a first insurance policy, the first insurance policy insuring the vehicle, and sensor data indicating a seating position within the vehicle;
determine a level of usage of the mobile device by the passenger by detecting push notifications, phone calls, and data usage;
receive, from one of: the first plurality of sensors or the second plurality of sensors, real-time travelling data of the vehicle;
compare one or more values of the travelling data to one or more predetermined ranges;
responsive to determining, based on the comparing, that the one or more values are within a first predetermined range, identify the travelling data as associated with a first type of transportation and classifying the travelling data as a trip of the passenger, the passenger being a holder of a second insurance policy, different from the first insurance policy;
responsive to determining that the travelling data is associated with a first type of transportation:
based on the travelling data of the trip, determine one or more driving behaviors of the driver of the vehicle for the trip;
calculate an insurance rating for the passenger of the vehicle based on the one or more driving behaviors of the driver for the trip and the level of usage of the mobile device based on the detecting of the push notifications, phone calls, and data usage, wherein calculating the insurance rating for the passenger includes:
calculating a score for each of the one or more driving behaviors of the driver for the trip;
assigning a weight to each score for each of the one or more driving behaviors of the driver for the trip;
calculating an overall driving score based on the assigned weights and the scores of each of the one or more driving behaviors of the driver for the trip; and
calculating an insurance rating for the passenger, wherein the insurance rating corresponds to the overall driving score of the driver;
transmit, in real time, the insurance rating for the passenger to the mobile device;
cause, in real time, display of at least one of the push notifications on a first digital page that is output on the mobile device, the at least one push notification including at least a travelling data interactive icon;
cause, in real time, display of the insurance rating and the traveling data on a second digital page that is output on the mobile device responsive to a selection of the travelling data interactive icon; and
responsive to determining, based on the comparing, that the one or more values are not within the first predetermined range, identify the travelling data as associated with another type of transportation different from the first type of transportation and discarding the travelling data.

2. The system of claim 1, wherein the first plurality of sensors comprises at least one of an accelerometer, speedometer, gyroscope, and GPS, and wherein the travelling data comprises at least one of data indicating acceleration, speed, angular momentum, and location of the vehicle.

3. The system of claim 1, wherein the one or more predetermined ranges each indicate a range of values of for at least one of vehicle speeds, vehicle locations, vehicle mileage, and average time driven.

4. The system of claim 1, wherein the server computer is further configured to:
calculate the insurance rating for the passenger of the vehicle further based on the data regarding the level of sound in the vehicle and the one or more driving behaviors of the driver for the trip.

5. The system of claim 1, wherein the server computer is further configured to:
calculate the insurance rating for the passenger of the vehicle further based on the level of usage.

6. The system of claim 1, wherein the telematics device and the mobile device associated with the passenger of the vehicle are a same device.

7. The system of claim 1, wherein the server computer is further configured to:
execute the rating manager application to:
access a webpage providing a user interface to request confirmation that the travelling data is associated with the first type of transportation.

8. The system of claim 1, wherein discarding the travelling data includes deleting the travelling data.

9. An apparatus comprising:
at least one processor;
a network interface configured to communicate, via a network, with a telematics device associated with a vehicle having a first plurality of sensors arranged therein and a mobile device associated with a first traveler in the vehicle, the mobile device including a second plurality of sensors; and
a memory storing computer-readable instructions that, when executed by the at least one processor, cause the apparatus to:
receive, from at least one of: the first plurality of sensors or the second plurality of sensors, data regarding a level of sound in the vehicle;
receive, from the mobile device associated with the first traveler, traveler information associated with the first traveler and a second traveler in the vehicle;
determine, from the received traveler information, that the first traveler is a passenger in the vehicle and the second traveler is a driver of the vehicle, determining that the second traveler is a driver of the vehicle is based on the traveler information including identification of the second traveler as a holder of a first insurance policy, the first insurance policy insuring the vehicle, and sensor data related to a seating position within the vehicle;
determine a level of usage of the mobile device by the passenger by detecting push notifications, phone calls, and data usage;
receive, from one of: the first plurality of sensors or the second plurality of sensors, real-time travelling data of the vehicle;
compare one or more values of the travelling data to one or more predetermined ranges;
responsive to determining, based on the comparing, that the one or more values are within a first predetermined range, identify the travelling data as associated with a first type of transportation and classifying the travelling data as a trip of the passenger, the passenger being a holder of a second insurance policy, different from the first insurance policy;
responsive to determining that the travelling data is associated with the first type of transportation:
based on the travelling data from the trip, determine one or more driving behaviors of the driver of the vehicle for the trip;
calculate an insurance rating for the passenger of the vehicle based on the one or more driving behaviors of the driver for the trip and the level of usage of the mobile device based on the detecting of the push notifications, phone calls, and data usage, wherein calculating the insurance rating for the passenger includes:
calculating a score for each of the one or more driving behaviors of the driver for the trip;
assigning a weight to each score for each of the one or more driving behaviors of the driver for the trip;
calculating an overall driving score based on the assigned weights and the scores for each of the one or more driving behaviors of the driver for the trip; and
calculating an insurance rating for the passenger, wherein the insurance rating corresponds to the overall driving score of the driver;
transmit, in real time, the insurance rating for the passenger to the mobile device;
cause, in real time, display of at least one of the push notifications on a first digital page that is output on the mobile device, the at least one push notification including at least a travelling data interactive icon;
cause, in real time, display of the insurance rating and the travelling data on a second digital page that is output on the mobile device responsive to a selection of the travelling data interactive icon; and
responsive to determining, based on the comparing, that the one or more values are not within the first predetermined range, identify the travelling data as associated with another type of transportation different from the first type of transportation and discarding the travelling data.

10. The apparatus of claim 9, wherein the telematics device and the mobile device associated with the passenger of the vehicle are a same device.

11. The apparatus of claim 9, wherein the first plurality of sensors comprises at least one of an accelerometer, speedometer, gyroscope, and GPS, and wherein the travelling data comprises at least one of data indicating acceleration, speed, angular momentum, and location of the vehicle.

12. The apparatus of claim 9, wherein the one or more predetermined ranges each indicate a range of values for at least one of vehicle speeds, vehicle locations, vehicle mileage, and average time driven.

13. The apparatus of claim 9, wherein the instructions, when executed by the at least one processor, further cause the apparatus to:
receive, from at least one of: the first plurality of sensors or the second plurality of sensors, data regarding a level of sound in the vehicle; and
calculate the insurance rating for the passenger of the vehicle further based on the data regarding the level of sound in the vehicle and the one or more driving behaviors of the driver.

14. The apparatus of claim 9, wherein the instructions, when executed by the at least one processor, further cause the apparatus to:
 calculate the insurance rating for the passenger of the vehicle further based on the level of usage.

15. A method comprising:
 receiving, by a computing device having at least one processor and from a mobile device, traveler information associated with a first traveler and a second traveler in a vehicle;
 receiving, from at least one of: the first plurality of sensors or the second plurality of sensors, data regarding a level of sound in the vehicle;
 determining, from the received traveler information, that the first traveler is a passenger in the vehicle and the second traveler is a driver of the vehicle, determining that the second traveler is a driver of the vehicle is based on the traveler information including identification of the second traveler as a holder of a first insurance policy, the first insurance policy insuring the vehicle, and sensor data indicating a seating position within the vehicle;
 determining, by the computing device, a level of usage of the mobile device by the passenger by detecting push notifications, phone calls, and data usage;
 receiving, by the computing device, real-time travelling data of the vehicle collected from one or more sensors installed on the mobile device, the mobile device being associated with the passenger associated with the vehicle, the passenger being a holder of a second insurance policy, different from the first insurance policy;
 comparing, by the computing device, the travelling data to one or more predetermined ranges;
 if it is determined that, based on the comparing, that one or more values of the travelling data are within a first predetermined range, identify the travelling data as associated with a first type of transportation and classifying the travelling data as a trip of the passenger;
 if it is determined that the travelling data is associated with the first type of transportation:
  determining, by the computing device, one or more driving behaviors of the driver of the vehicle for the trip based on the travelling data from the trip, the driver being a holder of a second insurance policy different from the first insurance policy, wherein the second insurance policy insures the vehicle;
  calculating, by the computing device, an insurance rating for the passenger based on the one or more driving behaviors of the driver for the trip and the level of usage of the mobile device based on the detecting of the push notifications, phone calls, and data usage, wherein calculating the insurance rating for the passenger includes:
   calculating a score for each of the one or more one or more driving behaviors of the driver for the trip;
   assigning a weight to each score for each of the one or more driving behaviors of the driver for the trip;
   calculating an overall driving score based on the assigned weights and the scores for each of the one or more driving behaviors of the driver for the trip; and
   calculating an insurance rating for the passenger, wherein the insurance rating corresponds to the overall driving score of the driver;
  transmitting in real time, by the computing device, the insurance rating for the passenger to the mobile device;
  causing, in real time, display of at least one of the push notifications on a first digital page that is output on the mobile device, the at least one push notification including at least a travelling data interactive icon;
  causing, in real time, display of the insurance rating and the traveling data on a second digital page that is output on the mobile device responsive to a selection of the travelling data interactive icon; and
 if it is determined that, based on the comparing, the one or more values are not within the first predetermined range, identify the travelling data as associated with another type of transportation different from the first type of transportation and discarding the travelling data.

16. The method of claim 15, wherein the one or more sensors comprise at least one of: an accelerometer, speedometer, gyroscope, and GPS, and wherein the travelling data comprises at least one of data indicating acceleration, speed, angular momentum, and location of the vehicle.

17. The method of claim 15, wherein the one or more predetermined ranges each indicate a range of values for at least one of vehicle speeds, vehicle locations, vehicle mileage, and average time driven.

18. The method of claim 15, further comprising:
 calculating, by the computing device, the insurance rating for the passenger of the vehicle further based on the data regarding the level of sound in the vehicle and the one or more driving behaviors of the driver.

19. The method of claim 15, further comprising:
 calculating, by the computing device, the insurance rating for the passenger of the vehicle further based on the level of usage.

* * * * *